(No Model.) 3 Sheets—Sheet 1.

R. CARTWRIGHT.
MACHINE FOR WELDING PIPES.

No. 400,829. Patented Apr. 2, 1889.

Witnesses,
Howard P. Denison.
Clarence Tucker.

Robert Cartwright Inventor.
By his Attorneys
Smith & Denison (No Model.) 3 Sheets—Sheet 2.
R. CARTWRIGHT.
MACHINE FOR WELDING PIPES.
No. 400,829. Patented Apr. 2, 1889.
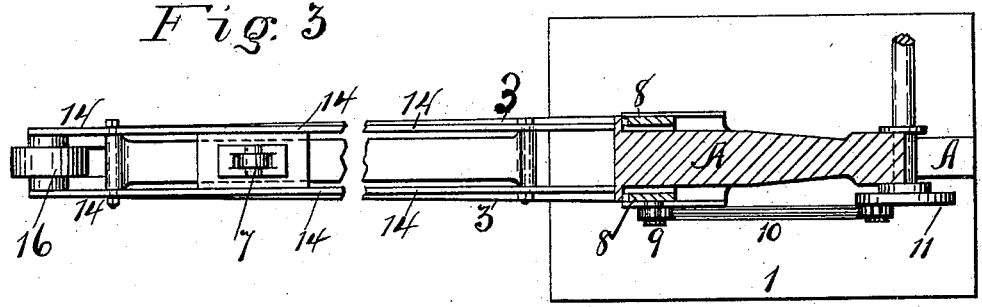
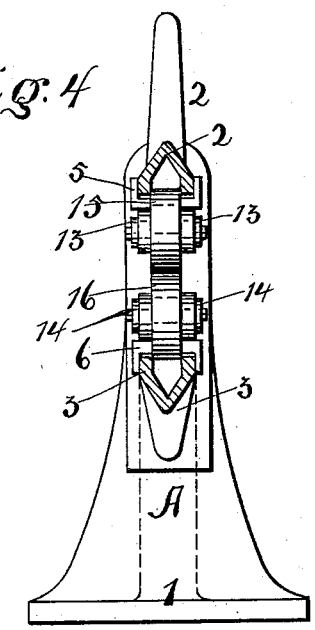
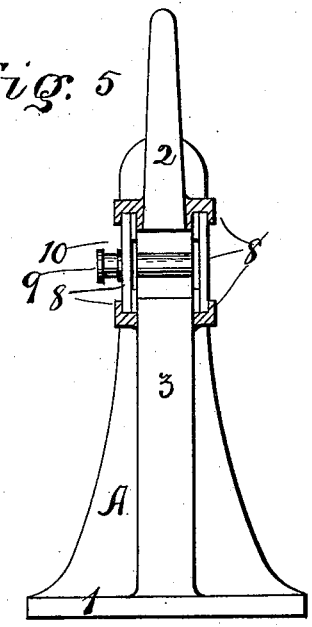
Witnesses.
Howard P. Denison
Clarence Tucker
Robert Cartwright, Inventor.
By his Attorneys,
Smith & Denison.

(No Model.) 3 Sheets—Sheet 3.

R. CARTWRIGHT.
MACHINE FOR WELDING PIPES.

No. 400,829. Patented Apr. 2, 1889.

Witnesses.
Howard P. Denison.
Clarence Tucker.

Robert Cartwright, Inventor,
By his Attorneys
Smith & Denison

United States Patent Office.

ROBERT CARTWRIGHT, OF ROCHESTER, ASSIGNOR OF ONE-HALF TO WILLIAM A. SWEET, OF SYRACUSE, NEW YORK.

MACHINE FOR WELDING PIPES.

SPECIFICATION forming part of Letters Patent No. 400,829, dated April 2, 1889.

Application filed July 28, 1888. Serial No. 281,319. (No model.)

*To all whom it may concern:*

Be it known that I, ROBERT CARTWRIGHT, of Rochester, county of Monroe, in the State of New York, a citizen of the United States, have invented certain new and useful Improvements in Machines for Welding Sheet-Metal Pipes, of which the following is a specification, reference being had to the accompanying drawings, in which—

Figure 1:
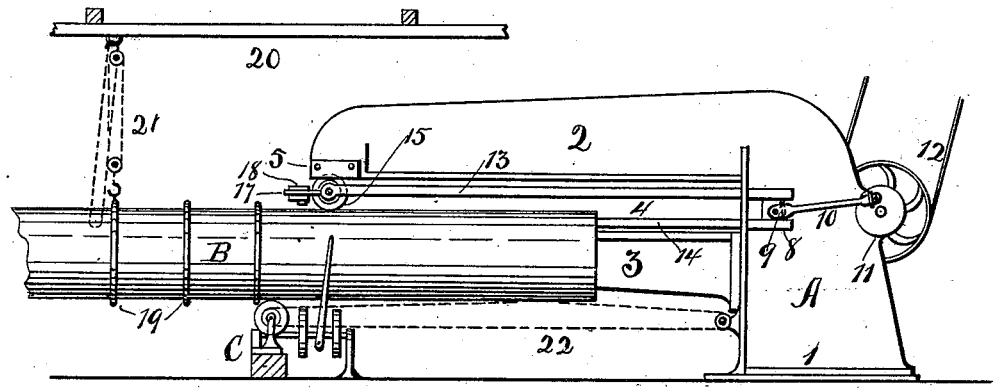
Figure 2:
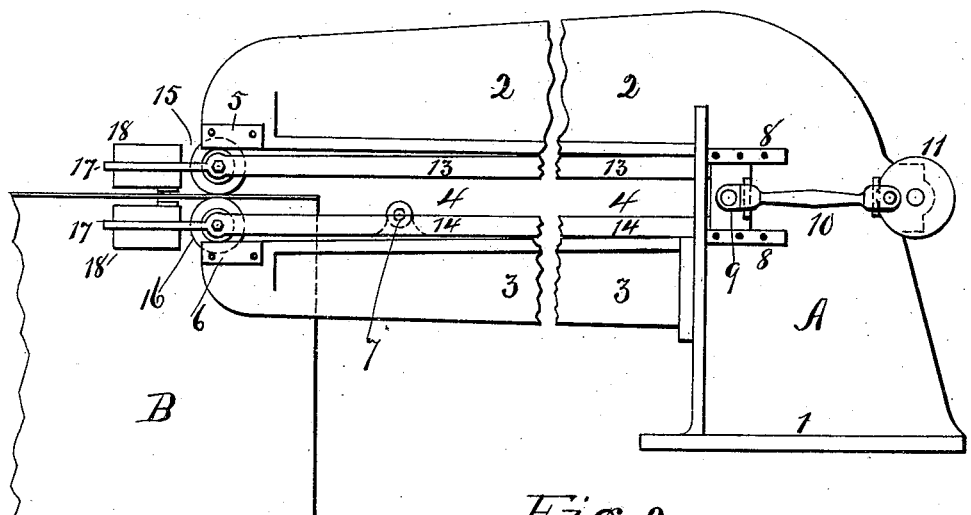
Figure 6:
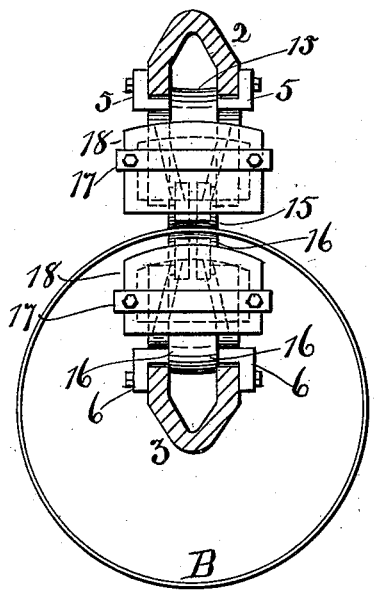
Figure 7:
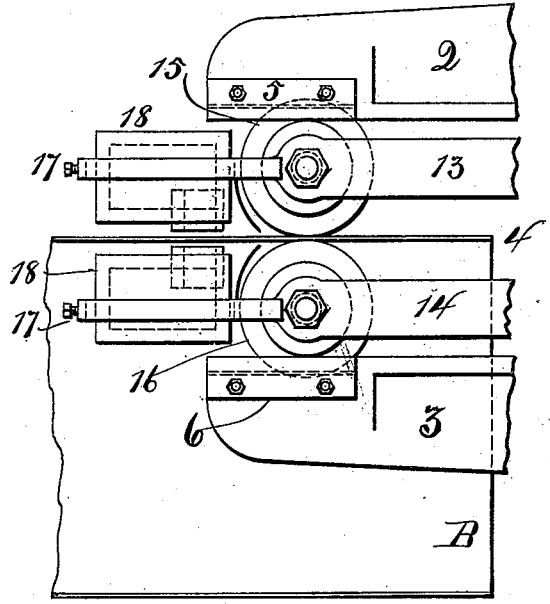
Figure 8:
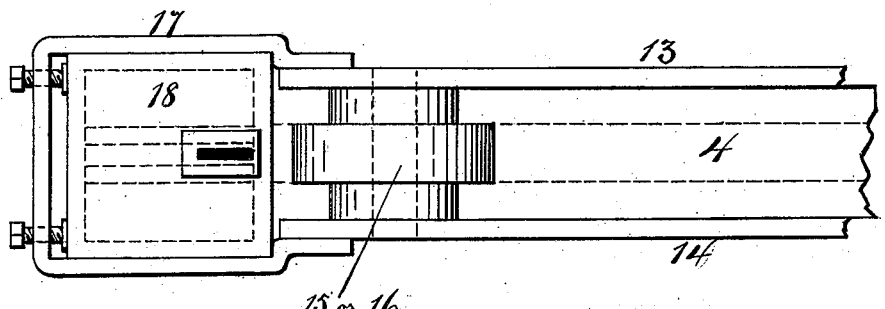

Figure 1 is a side elevation. Fig. 2 is a sectional side elevation enlarged and showing both the internal and external furnaces and welding-rolls. Fig. 3 is a top plan of the lower arms and a horizontal section of the body. Fig. 4 is a front elevation, with the furnaces removed. Fig. 5 is a rear elevation. Fig. 6 is a front elevation showing the pipe between the welding-rolls and furnaces. Fig. 7 is a side sectional elevation of Fig. 6. Fig. 8 is a plan of the issue-face of the furnace, a plan of the welding-roll, and a plan of the frame carrying the roll and furnace.

This invention relates to machinery and apparatus for welding the edges of a lap or butt jointed sheet-metal pipe, tube, or cylinder by means of welding-rolls having a reciprocating motion imparted to them, and in which the joint is welded substantially simultaneous with its heating, its heating being effected by a gas-furnace or other equivalent means by which the iron is heated just in advance of the welding-roll, so that the operation of heating and welding is substantially simultaneous, the apparatus being also provided with feed mechanism to feed the pipe through under the roll or between the rolls as fast as it is welded and simultaneous with the welding.

The object of my invention is to weld the meeting edges of sheet-metal pipes, tubes, and cylinders perfectly, and without any buckling or crinkling when they cool, to perform the work quickly, to make a perfect weld inside and outside simultaneously without reducing the thickness of the metal at the weld, without expanding or increasing the size of the pipe, and, in short, to produce a perfect pipe, tube, or cylinder from sheet-metal, capable of standing high pressures.

My invention consists in the several novel features of construction and operation hereinafter described, and which are specifically set forth in the several clauses of claims hereunto annexed. It is constructed as follows:

A is the welder, consisting of a base, 1, and arms 2 3, creating the elongated slotway 4, opening into the body of the machine. These parts are integral, and are usually constructed from cast-iron. Upon the front end and inside edge of the arms 2 3, I secure the bearing-blocks 5 6, of steel or other hardened metal.

Upon the upper surface of the arm 3, I erect one or more friction-rolls, 7. Upon the side and at the rear end of the slotway 4, I place the parallel guides 8 of ordinary construction, and 9 is the head adapted to slide in the guides, and 10 is a pitman-rod connecting it to the crank 11, to which power is imparted by the belt 12 and the pulley. To this head 9, I secure the bars 13 and 14 parallel to each other and extending forward, substantially, to the outer ends of the arms 2 3, and in or upon the outer ends of these arms, each of them, I mount welding-rolls 15 16, and, as these welding-rolls will form the subject-matter of a separate application, I will not here specifically describe their construction; also, to the front ends of the arms 13 14, I secure the frames 17, in which I mount my heating-furnaces 18, and which are carried by the arms 13 and 14, respectively, and, as these heating-furnaces will form the subject-matter of a separate application, I will not here specifically describe the same further than to say that they are furnaces adapted to use hydrocarbon or other gases with an admixture of atmospheric air and with a blast, and to which the air and gas are conveyed by pipes.

B is the pipe being welded, which passes between the welding-rolls 15 16, which are respectively one inside and one outside of the pipe and vertically above each other, and this pipe is held while unwelded in a tubular form with the proper lap or meeting of the joint before welding by the clamping-rings 19, which I shall not here specifically describe, as they will form the subject-matter of a separate application. The outer end of the pipe is supported and carried along by the overhead railway 20 and the chain or pulleys 21, which are shown in the drawings of the ordinary differential style.

C is the feed mechanism, of any ordinary construction, and 22 is the feed-chain (endless) passing over the pulleys and connected by any ordinary style of grip to the front end of the tube.

It will be observed that the rollers or welding-rolls reciprocate simultaneously and in conjunction with the furnaces; that by this reciprocation the welding is continuous, and that the simultaneous heating and welding are continuous and not intermittent, and that the welding is effected between two revolving surfaces, one internal and the other external to the pipe, in conjunction with an internal heating-furnace and an external heating-furnace opposite each other, with a continuous and simultaneous reciprocatory motion imparted to both the welding-rollers and furnaces, and that such welding is accomplished with a minimum of friction.

What I claim as my invention, and desire to secure by Letters Patent, is—

1. For welding a tube-joint, the combination of two rollers, one internal and the other external, mounted upon a reciprocating frame, with an internal heating-furnace and an external heating-furnace mounted upon the same frame, substantially as described.

2. For the continuous and simultaneous heating and welding of a pipe-joint, the combination of the heating-furnaces mounted upon a reciprocating frame and located within and outside of the pipe of the welding-rolls, mounted upon the same frame, substantially as described.

3. A reciprocating frame upon which heating-furnaces and welding-rolls are mounted contiguous to each other, in combination with a crank having a pitman-rod connected to the frame, substantially as described.

4. A reciprocating frame carrying welding-rolls and heating-furnaces contiguous to each other, in combination with the rolls and furnaces, substantially as described.

5. A reciprocating frame carrying welding-rolls, in combination with heating-furnaces mounted upon the frame, substantially as described.

In witness whereof I have hereunto set my hand this 1st day of May, 1888.

ROBT. CARTWRIGHT.

In presence of—
H. P. DENISON,
C. W. SMITH.